US009069437B2

(12) United States Patent
Yao et al.

(10) Patent No.: US 9,069,437 B2
(45) Date of Patent: Jun. 30, 2015

(54) WINDOW MANAGEMENT METHOD, APPARATUS AND COMPUTING DEVICE

(75) Inventors: Yuan Yao, Beijing (CN); Bo Qin, Beijing (CN); Jingbin Zhao, Beijing (CN); Hongxing Chen, Beijing (CN); Zhuomeng Li, Beijing (CN); Chi Zhang, Beijing (CN)

(73) Assignees: Lenovo (Beijing) Limited, Beijing (CN); Beijing Lenovo Software, Ltd., Beijing (CN)

( * ) Notice: Subject to any disclaimer, the term of this patent is extended or adjusted under 35 U.S.C. 154(b) by 675 days.

(21) Appl. No.: 13/259,601

(22) PCT Filed: Dec. 20, 2010

(86) PCT No.: PCT/CN2010/002091
§ 371 (c)(1),
(2), (4) Date: Dec. 13, 2011

(87) PCT Pub. No.: WO2011/072497
PCT Pub. Date: Jun. 23, 2011

(65) Prior Publication Data
US 2012/0084717 A1  Apr. 5, 2012

(30) Foreign Application Priority Data

Dec. 18, 2009  (CN) .......................... 2009 1 0242879
Dec. 23, 2009  (CN) .......................... 2009 1 0243834

(51) Int. Cl.
*G06F 3/0481* (2013.01)
(52) U.S. Cl.
CPC .... *G06F 3/0481* (2013.01); *G06F 2203/04803* (2013.01)

(58) Field of Classification Search
CPC ..... G06F 3/0481; G06F 9/4443; G06F 3/048; G06F 3/04845; G06F 3/1446; G06F 3/0482; G06F 2203/04803; G06F 2203/04804; G06T 3/40
USPC .......................... 715/791, 798–801, 838, 863
See application file for complete search history.

(56) References Cited

U.S. PATENT DOCUMENTS 6,008,809 A * 12/1999 Brooks .......................... 715/792
6,310,631 B1 * 10/2001 Cecco et al. ................... 715/792
(Continued)

FOREIGN PATENT DOCUMENTS

CN         1326564 A      12/2001
CN         1802691 A       7/2006
(Continued)

OTHER PUBLICATIONS

International Search Report in foreign counterpart Application No. PCT/CN2010/002091, dated Mar. 24, 2011.

*Primary Examiner* — Andrew Tank
(74) *Attorney, Agent, or Firm* — Kinney & Lange, P.A.

(57) ABSTRACT

A window management method, apparatus and a computing device are provided. The window management apparatus comprises a window rendering management device for managing the at least two windows in response to an input operation, to change the size and location of a target window of the at least two windows to which the input operation is directed, and simultaneously adaptively change the size and location of at least one other window of the at least two windows. With the embodiments of the present invention, upon detection of an input operation, a window control operation can be performed on at least two opened windows to change the sizes and locations of at least two opened windows simultaneously. In this way, a plurality of windows can be managed collectively by fewer operations, and the required numbers of user operations can be reduced.

28 Claims, 14 Drawing Sheets

(56) References Cited

U.S. PATENT DOCUMENTS

| | | | |
|---|---|---|---|
| 6,456,305 B1* | 9/2002 | Qureshi et al. | 715/800 |
| 6,850,256 B2* | 2/2005 | Crow et al. | 715/798 |
| 7,184,031 B2* | 2/2007 | Lin et al. | 345/173 |
| 7,343,567 B2* | 3/2008 | Mann et al. | 715/826 |
| 7,703,041 B2* | 4/2010 | Ito et al. | 715/804 |
| 7,839,419 B2* | 11/2010 | Hanggie et al. | 345/619 |
| 8,002,633 B2* | 8/2011 | Shimizu | 463/31 |
| 8,510,669 B2* | 8/2013 | Schiller | 715/769 |
| 8,527,907 B2* | 9/2013 | Goshey | 715/863 |
| 8,547,347 B2* | 10/2013 | Chiang et al. | 345/173 |
| 8,887,087 B2* | 11/2014 | Hilgers et al. | 715/788 |
| 2005/0108656 A1* | 5/2005 | Wu et al. | 715/801 |
| 2006/0291749 A1* | 12/2006 | Scheidhauer et al. | 382/298 |
| 2007/0214431 A1* | 9/2007 | Amadio et al. | 715/788 |
| 2010/0313110 A1* | 12/2010 | Claridge et al. | 715/212 |

FOREIGN PATENT DOCUMENTS

| | | |
|---|---|---|
| CN | 101021765 A | 8/2007 |
| CN | 101354628 A | 1/2009 |
| CN | 101477436 A | 7/2009 |

* cited by examiner

| Title Bar 1 | Title Bar 3 |
| --- | --- |
| Menu Bar 1 | Menu Bar 3 |
| Window Work Area 1 | Window Work Area 3 |
| | Title Bar 4 |
| | Menu Bar 4 |
| Title Bar 2 | Window Work Area 4 |
| Menu Bar 2 | Title Bar 5 |
| | Menu Bar 5 |
| Window Work Area 2 | Window Work Area 5 |

FIG. 8

| Title Bar 1 | Title Bar 3 |
| --- | --- |
| Menu Bar 1 | Menu Bar 3 |
| Window Work Area 1 | Window Work Area 3 |
| Title Bar 2 | Title Bar 4 |
| Menu Bar 2 | Menu Bar 4 |
| Window Work Area 2 | Window Work Area 4 |

FIG. 9

WINDOW MANAGEMENT METHOD, APPARATUS AND COMPUTING DEVICE

TECHNICAL FIELD

The invention relates to window management with an application in an operation system, and more particularly, to a window management method, apparatus and a computing device.

BACKGROUND

The management of windows is an important issue for an operation system.

In various operation systems, a window can include several major parts such as title bar, menu bar, work area, etc.

For a single window, a user can scale or move the window by dragging the mouse. The user also can control the size of the window by using mouse to double-click its title bar, and even adjust the size of the window using a restore button provided on the title bar.

However, the window management in the prior art suffers from at least the following defects.

When there are two or more windows, the user can only manage the windows one by one to achieve the desired locations and sizes of the windows. In this case, the operation is very complicated. This is illustrated by an example as follows:

There are three windows shown as arranged from left to right in FIG. 1a. If the user wants to arrange the three windows in parallel, he/she has to select one of the windows (the bottom one) first and adjust the size of the selected window to obtain the arrangement shown in FIG. 1b.

Then, the user selects the middle window and adjusts its size to obtain the arrangement shown in FIG. 1c. Finally, the user selects the top one and adjusts its size to obtain the arrangement shown in FIG. 1d.

It should be noted that it further requires the user to perform a number of operations to individually adjust the size and location of each of the windows.

There are only three windows in the above example. If there are a larger number of windows, more operations will be required. Thus, when there are many windows, the existing window management solution requires a large number of user operations, which causes inconvenience.

Moreover, windows are the most important part in a user interface of a computer system. They provide a user with a visible interface from which the user can view the resources provided by the system. Herein, when presented in a window, a resource provided by the system is referred to as an element in the window. For the system, window is a tool. The more information a window provides to the user, the higher the utilization of the window and thus the system resources.

In the prior art, a window provides only basic information to the user. For example, when a folder is opened in a window, the contents in the folder will be shown as a list of icons in the window. When the user scales a window, it is possible to display as many icons as possible in a visible area of the window by changing the layout of the elements in the window, as illustrated in FIG. 2.

In this way, the number of elements displayed in the visible area of the window can be changed by changing the layout of the elements. However, this known approach still fails to take full advantage of a window to provide more information to the user.

SUMMARY OF THE INVENTION

The embodiments of the present invention provide a window management method and apparatus as well as a computing device, which can simplify the user operations during window management, and improve the utilization of the window and thus the resources.

According to an embodiment of the present invention, a window management apparatus for managing at least two windows opened in an electronic device is provided, which comprises:

a window rendering management device configured to manage the at least two windows in response to an input operation, to change the size and location of a target window of the at least two windows to which the input operation is directed and simultaneously adaptively change the size and location of at least one other window of the at least two windows.

According to an embodiment of the present invention, the window rendering management device comprises:

an input detection module configured to detect the input operation; and a window control module configured to perform, according to the input operation detected by the input detection module, window control operation on the target window and the at least one other window, to change the size and location of the target window and simultaneously adaptively change the size and location of the at least one other window.

According to an embodiment of the present invention, the window management apparatus further comprises;

a window element rendering management device configured to manage the rendering of an element in the target window when the target window is scaled.

According to an embodiment of the present invention, the window element rendering management device comprises, a window size detection module configured to detect, when the target window is scaled, the size of the scaled target window;

a display type determination module configured to determine a display type of an element in the scaled target window based on a preset correspondence between window size and element display type; and a rendering module configured to render the element in the target window according to the determined display type.

According to an embodiment of the present invention, the window element rendering management device is configured for managing an element in the at least one other window which is scaled, in addition to the rendering of the element in the target window.

In order to achieve the above object, according to another embodiment of the present invention, a window management method for managing at least two windows opened in an electronic device is provided, which comprises:

a window rendering management step of managing the at least two windows in response to an input operation, to change the size and location of a target window of the at least two windows to which the input operation is directed and simultaneously adaptively change the size and location of at least one other window of the at least two windows.

According to an embodiment of the present invention, the window rendering management step comprises:

detecting the input operation, and performing, according to the detected input operation, window control operation on the target window and the at least one other window, to change the size and location of the target window and simultaneously adaptively change the size and location of the at least one other window.

According to an embodiment of the present invention, the window management method further comprises:

a window element rendering management step of managing the rendering of an element in the target window when the target window is scaled.

According to an embodiment of the present invention, the window element rendering management step comprises:

detecting the size of the target window when the target window has been scaled;

determining a display type of an element in the scaled target window based on a preset correspondence between window size and element display type; and rendering the element in the target window according to the determined display type.

In order to achieve the above object, according to yet another embodiment of the present invention, a computing device is provided comprising a processor, an input device, a storage device and a display device, wherein:

the display device has at least two windows displayed as opened thereon;

the processor is configured to detect an input operation from the input unit and perform, according to the detected input operation, window management operation on the at least two opened windows, to change the size and location of the at least two opened windows simultaneously.

According to an embodiment of the present invention, the processor is further configured to change the rendering of an element in a target window to which the input operation is directed, while the target window is scaled.

The embodiments of the present invention have the following advantageous effects.

With the embodiments of the present invention, upon detection of an input operation, a window control operation can be performed on at least two opened windows to change the size and location of each of the at least two opened windows simultaneously. In this way, a plurality of windows can be managed collectively with fewer operations, leading to a reduced number of user operations.

Further, according to the embodiments of the present invention, when the target window is scaled, it is possible to detect the size of the scaled target window, determine the display type of the elements in the scaled target window based on a preset correspondence between window size and element display type, and render the elements in the target window according to the determined display type. Thus, with the method according to the present invention, the display type of the elements rendered in a window can be changed with change in the size of the window. As an example, an icon of a file can be displayed initially in a window. When the window is scaled up to some extent, a thumbnail of the file can be displayed in the window to provide more information. When the window is further scaled up, more information on the file can be displayed. Therefore, it is possible to present more information to the user in a window, and accordingly the utilization of the window and thus the resources can be improved.

BRIEF DESCRIPTION OF THE DRAWINGS

For illustration of the embodiments of the present invention or the prior art solutions, the following description will be given with reference to the figures. Obviously, the figures described below only illustrate some embodiments of the present invention. Those skilled in the art can readily envisage other figures.

FIG. 8 is a schematic diagram showing that a window is newly opened and added to the arrangement in FIG. 7 and the five windows are arranged in a tiled manner according to an embodiment of the present invention;

FIG. 9 is a schematic diagram showing the position of a location determination control presented on a screen with respect to the windows;

DETAILED DESCRIPTION OF PREFERRED EMBODIMENTS

The embodiments of the present invention will be explained in the following with reference to the figures. The following description of embodiments is not exhaustive. One skilled in the art can readily envisage other embodiments, which are within the scope of the present invention.

Figure 3:
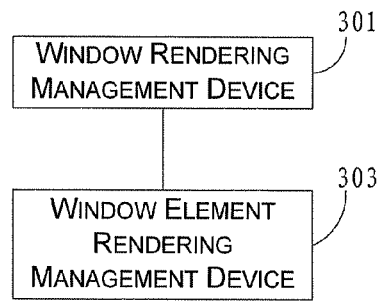
FIG. 3 is a schematic block diagram of a window management apparatus according to an embodiment of the present invention.

According to an embodiment of the present invention, a window management apparatus is provided. As shown in FIG. 3, the window management apparatus comprises a window rendering management device 301 which is configured to manage, in response to an input operation, the size and location of a target window to which the input operation is directed, and the size and location of at least one further window opened. With the window management apparatus according to the embodiment of the present invention, a user can perform a window control operation on at least two opened windows to change the sizes and locations of the at least two opened windows simultaneously. In this way, a plurality of windows can be managed collectively with fewer user operations, In addition, the window management apparatus can further comprise a window element rendering management device 303 (shown in dashed lines in FIG. 3, indicating that the window element rendering management device 303 is optional) which is configured to manage the rendering of elements in the target window when the target window is scaled. With the window management apparatus of this embodiment having the window element rendering management device 303, when the size and location of a window is changed, it is possible to automatically change the display type, size and number of elements in the window in response to the change in the size of the window. In this way, it is possible to present more information to the user through the window, and accordingly the utilization of the window and the system resource can be improved.

Next, the window rendering management device 301 of the window management apparatus according to an embodiment of the present invention will be described in detail. It can be appreciated by one skilled in the art that the present invention is not limited to the following details.

Herein, the window rendering management device 301 according to an embodiment of the present invention will be described first. The window rendering management device 301 is configured to manage at least two windows opened in an electronic device, and comprises: an input detection module which detects an input operation; and a window control module which performs, according to the input operation detected by the input detection module, window control operation on the at least two windows, to change the size and location of each of the at least two windows. Herein, the window control module performs the window control operation on the at least two windows to simultaneously change the sizes and locations of the at least two windows.

Reference is now made to FIGS. 4a-4d, which are schematic diagrams showing a first example of window changing process according to the window rendering management of an embodiment of the present invention.

Figure 4A:
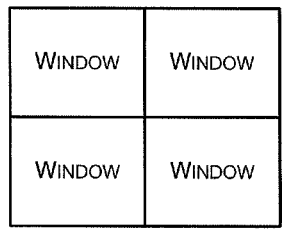
FIGS. 4a-4d are schematic diagrams showing a first example of window changing by the window rendering management of an embodiment of the present invention.
Figure 4B:
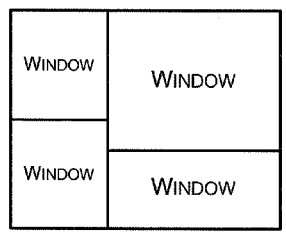
Figure 4C:
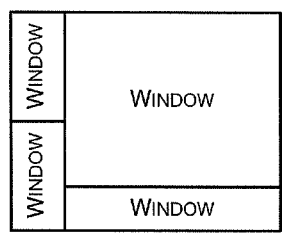
Figure 4D:
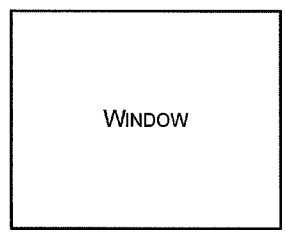

As shown in FIG. 4a, there are initially four windows displayed on a screen in a tiled manner. It is assumed that the user selects the upper right window with a mouse and drags the window towards lower-left. When the window is dragged to a first location, the four windows are displayed on the screen as in FIG. 4b. It can be seen that the upper right window is enlarged, and at the same time the size and location of each of other three windows change accordingly. Then, the user drags the window further towards lower-left to a second location, and the four windows are displayed on the screen as in FIG. 4c. It can be seen that as the upper right window is further enlarged, the size and location of each of other three windows further change. Then, the user drags the window further towards lower-left to a third location, and the four windows are displayed on the screen as in FIG. 4d. It can be seen that the original upper right window occupies almost the entire screen, and the other three windows are minimized.

In the above example, only four states in the changing process are described. However, it can be appreciated that the above changing process can be continuous.

Thus, with the window rendering management device according to the embodiment of the present invention, the use can manage a plurality of windows in a coordinated manner by fewer operations or even a single operation. Therefore, the complexity and workload required for a user to manage the windows can be greatly reduced.

It can be appreciated that, while in the above example the operations are carried out using a mouse; these operations can be performed on a touch screen in the following example.

The mouse may be inapplicable to a touch screen. The input operation can be detected by detecting a change in location of a touch on the touch screen. As shown in FIG. 4a, the user can first touch at the location of the upper right window and then make a touch at a different location. So, with the change to the latter location, the window control module changes the window arrangement of FIG. 4a to the window arrangement of FIG. 4c.

The embodiments of the present invention will be further discussed with reference to FIGS. 4e-4g, which are schematic diagrams showing a second example of window changing process according to the window rendering management of an embodiment of the present invention.

Figure 4E:
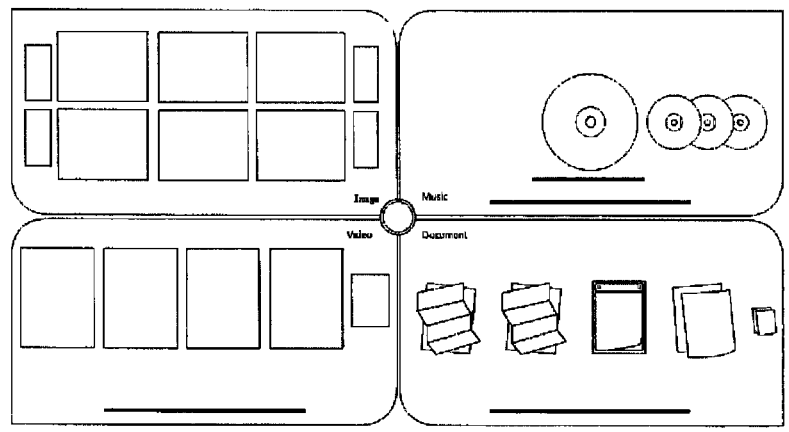
FIGS. 4e-4g are schematic diagrams showing a second example of window changing by the window rendering management of an embodiment of the present invention.

Initially, as shown in FIG. 4e, four windows (including an image display window, a music window, a video window and a file window) are arranged in a tiled manner in four areas of equal size on the screen, respectively. A location determination control (shown as a circle and will be further detailed hereinafter) is provided at a first location, i.e., the intersection of the four windows.

Figure 4F:
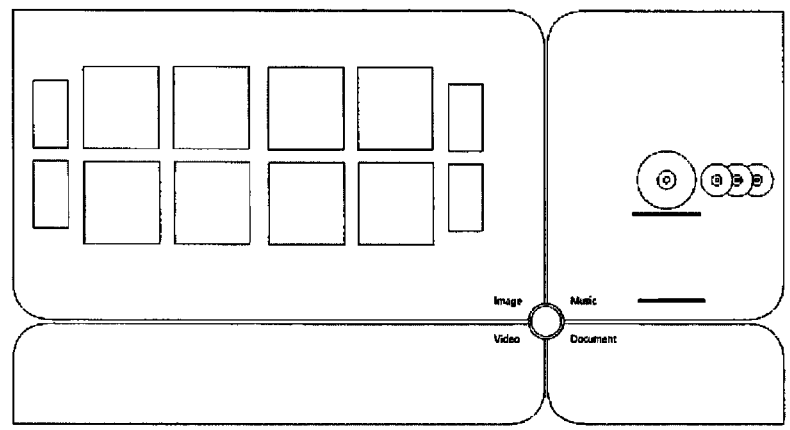

As shown in FIG. 4f, as the user drags the location determination control to a second location, the four windows are controlled in real time such that they are still displayed in a tiled manner with their intersection overlapped with the current location of the location determination control. It can be seen that the image window becomes larger while the other three windows become smaller. Accordingly, the contents displayed in each of the four windows also change. Specifically, more thumbnails are displayed in the image window, while the contents displayed in each of the other three windows become fewer or smaller, with the change in the sizes of the respective windows.

Figure 4G:
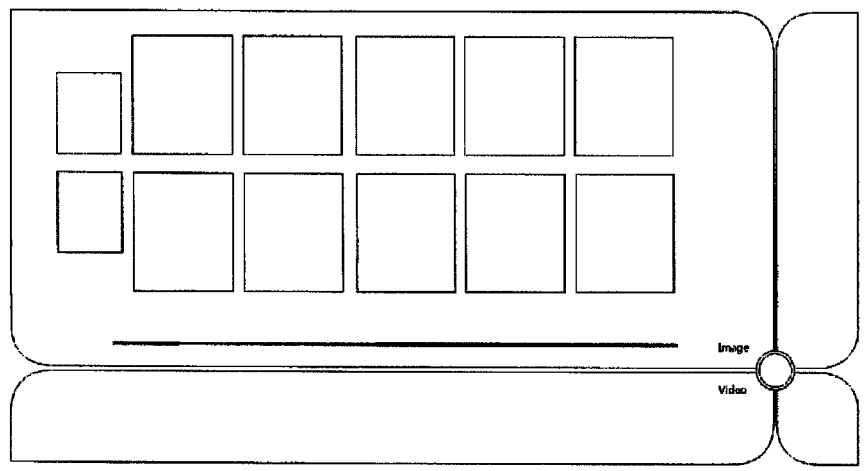

As shown in FIG. 4g, as the user drags the location determination control to a third location, the four windows are controlled in real time such that they are still displayed in a tiled manner with their intersection overlapped with the current location of the location determination control. It can be seen that the image window further becomes larger while the other three windows further become smaller. Accordingly, the contents as displayed in each of the four windows change. Specifically, more thumbnails are displayed in the image window, while the contents displayed in each of the other three windows also change to be adaptive to the change in the sizes of the respective windows.

In the above example, three states during the changing process are described. However, it can be appreciated that the above process can be continuous if the user continuously drags the location determination control.

The foregoing describes a changing process from FIG. 4e to FIG. 4g. The specific implementation will be detailed in the following.

As shown in FIG. 4e, the four windows are displayed in a tile manner with their intersection located at the location of the location determination control. In this case, the size and location of each of the four windows can be determined directly with the location determination control (as described below).

A coordinate system can be set. For example, in FIG. 4e, the coordinates of the screen can be set as (0, 0) for the lower left vertex, (X, 0) for the lower right vertex, (0, Y) for the upper left vertex and (X, Y) for the upper right vertex.

The location of each window can be determined from the coordinates of the four vertexes.

The current coordinates of the location determination control are assumed to be (X1, Y1). In this case, the coordinates of the four vertexes of the window at the lower left section of the screen can be (0, 0), (X1, 0), (X1, Y1) and (0, Y1), respectively. The coordinates of the four vertexes of the window at the upper left section of the screen can be (0, Y1), (X1, Y1), (X1, Y) and (0, Y), respectively. The coordinates of the four vertexes of the window at the lower right section of the screen can be (X1, 0), (X, 0), (X, Y1) and (X1, Y1), respectively. The coordinates of the four vertexes of the window at the upper right section of the screen can be (X1, Y1), (X, Y1), (X, Y) and (X1, V), respectively.

For each window, there are three vertexes whose coordinates are associated with the current coordinates of the location determination control. According to an embodiment of the present invention, the input detection module can detect the coordinates of the location determination control at any time. The coordinates of the windows displayed in a tiled manner, which are associated with the coordinates of the location determination control, can be modified based on the coordinates of the location determination control. Then, the window control operation can be performed to change the size and location of each of the at least two windows simultaneously, based on the modified coordinates of the windows.

The current coordinates of the location determination control are changed (i.e., dragged) to (X2, Y2). The, the coordinates of the four vertexes of the window at the lower left section of the screen become (0, 0), (X2, 0), (X2, Y2) and (0, Y2), respectively. The coordinates of the four vertexes of the window at the upper left section of the screen become (0, Y2), (X2, Y2), (X2, Y) and (0, Y), respectively. The coordinates of the four vertexes of the window at the lower right section of the screen become (X2, 0), (X, 0), (X, Y2) and (X2, Y2), respectively. The coordinates of the four vertexes of the window at the upper right section of the screen become (X2, Y2), (X, Y2), (X, Y) and (X2, Y), respectively.

Upon determination of the coordinates, the size and location of each window can be adjusted.

Typically, the purpose of managing a window is to adjust the ratio at which the screen is occupied by the window. Thus, according to an embodiment of the present invention, after the window control module performs the window control operation, at least one of the at least two windows remains displayed on the screen.

Also, according to an embodiment of the present invention, the window control operation is performed on more than one window. In general, if the more than one window is displayed with overlapping, the user cannot have a complete view of each of these windows. Thus, according to an embodiment of the present invention, the window control module can perform the window control operation on at least two windows currently opened, such that the arrangement of the windows can satisfy the window arrangement rule corresponding to the input operation, thus preventing the windows displayed on the screen from overlapping with each other.

The window arrangement rule is set to specify that the windows are displayed on the screen in a tiled manner or at a certain interval, without overlapping with each other.

Since the displayed windows do not overlap with each other, the respective contents of the windows will not be blocked. In this way, the user can have a complete view of the displayed contents, and the visual experience of the user can be improved.

Alternatively, a correspondence between the input operation and the window arrangement rule can be set in advance. In this case, upon detection of the input operation, the windows can be automatically managed in a coordinated manner according to the window arrangement rule corresponding to the input operation, thereby reducing the workload of the user.

Figure 5:
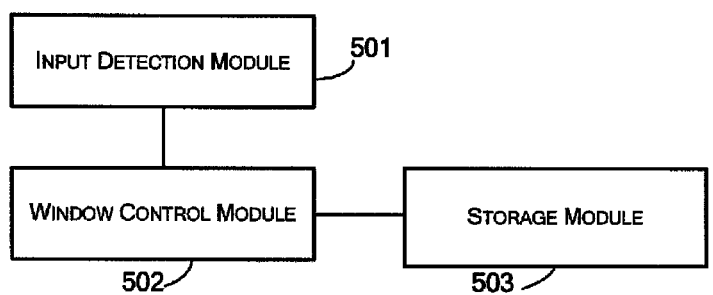
FIG. 5 is a schematic block diagram of a window rendering management device according to an embodiment of the present invention.

According to this embodiment of the present invention, the input operation corresponds to a window arrangement rule. The window control operation can be performed on at least two windows according to the window arrangement rule corresponding to the input operation detected by the input detection module, to change the sizes and locations of the at least two windows simultaneously. In this case, FIG. 5 shows the window management apparatus according to this embodiment, which comprises:

a storage module 503 for storing in advance a correspondence between an input operation and a window arrangement rule specifying a window arrangement for at least two windows;

an input detection module 501 for detecting an input operation; and a window control module 502 for performing window control operation on at least two windows currently opened, such that the arrangement of the windows can satisfy the window arrangement rule corresponding to the input operation, the window control operation including a window size control operation and a window location control operation.

Figure 6:
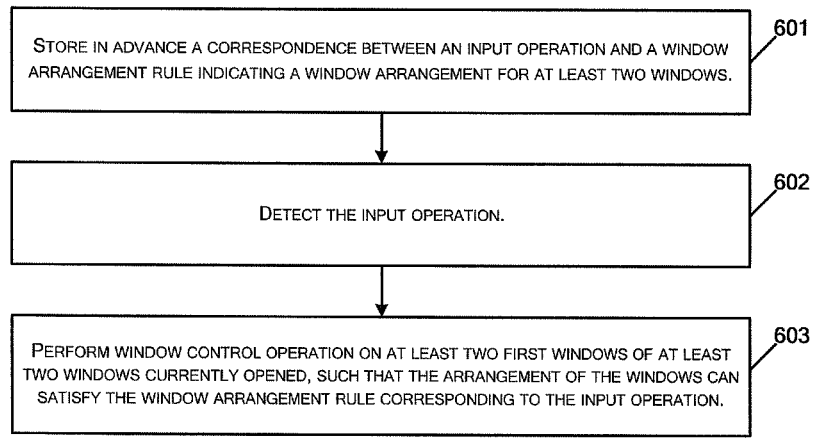
FIG. 6 is a flowchart of a window rendering management method according to an embodiment of the present invention.

FIG. 6 illustrates the window rendering management method according to an embodiment of the present invention, which comprises the following steps of:

step 601: storing in advance a correspondence between an input operation and a window arrangement rule specifying a window arrangement for at least two windows;

step 602: detecting an input operation; and step 603: performing window control operation on at least two windows currently opened, such that the arrangement of the windows can satisfy the window arrangement rule corresponding to the input operation, the window control operation including a window size control operation and a window location control operation.

The embodiments of the present invention will be further detailed in the following.

According to an embodiment of the present invention, it is required to determine a window arrangement rule corresponding to the input operation. According to an embodiment of the present invention, the correspondence between an input operation and a window arrangement rule can be:

when the trail along which a cursor moves is a straight line running vertically, the screen is equally divided into parts for displaying the currently opened windows in a top-to-bottom arrangement; and when the trail along which a cursor moves is a straight line running horizontally, the screen is equally divided b into parts for displaying the currently opened windows in a left-to-right arrangement.

Figure 1A:
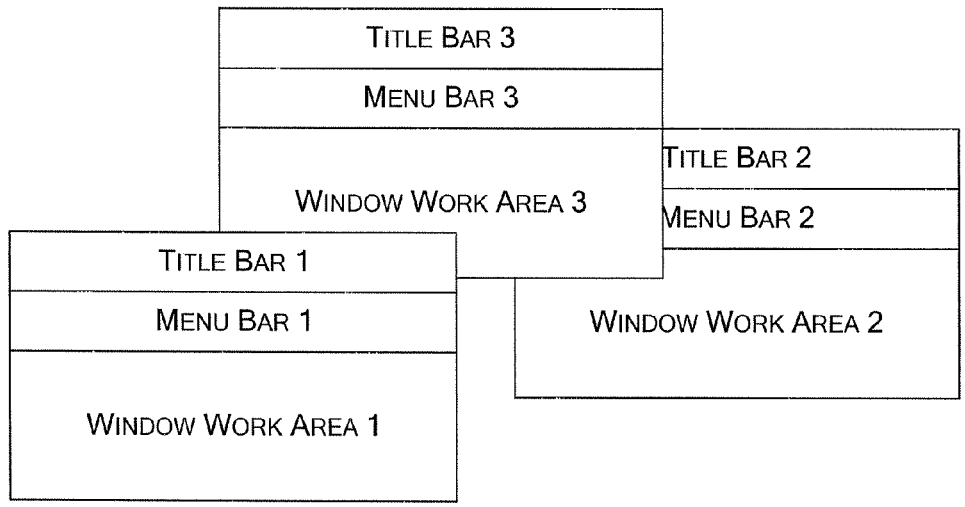
FIGS. 1a-1d are schematic diagrams showing a process of the prior art window management.
Figure 1B:
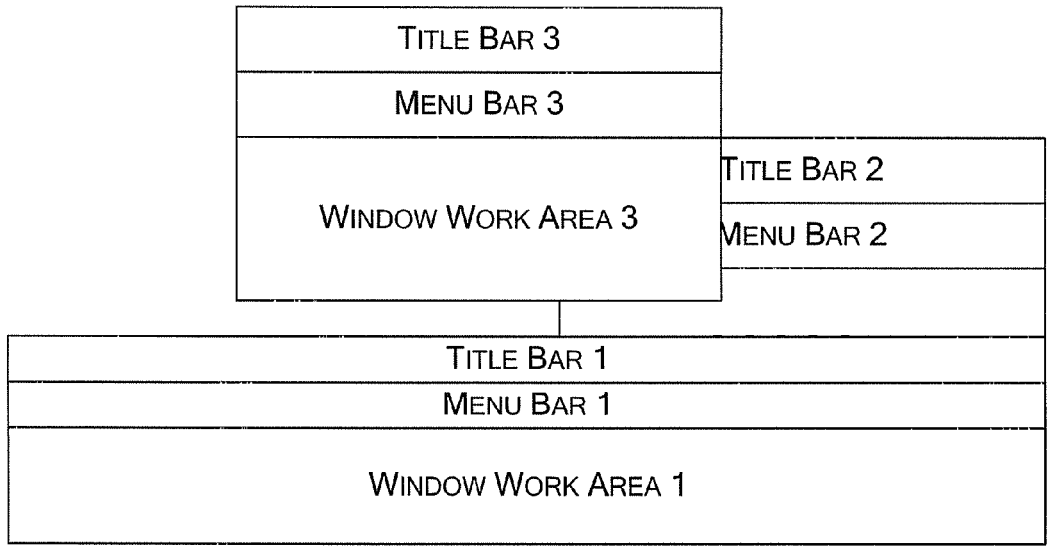
Figure 1C:
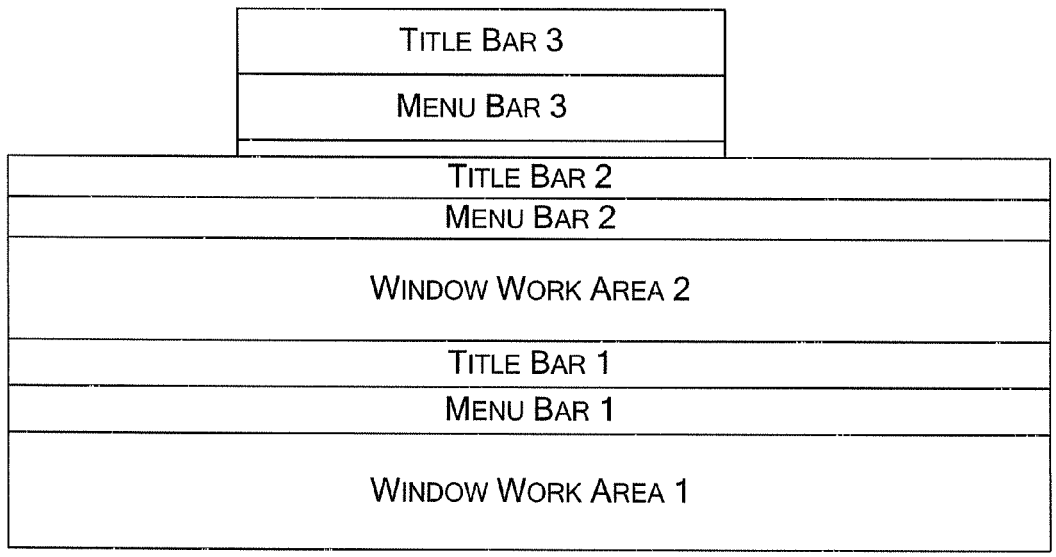
Figure 1D:
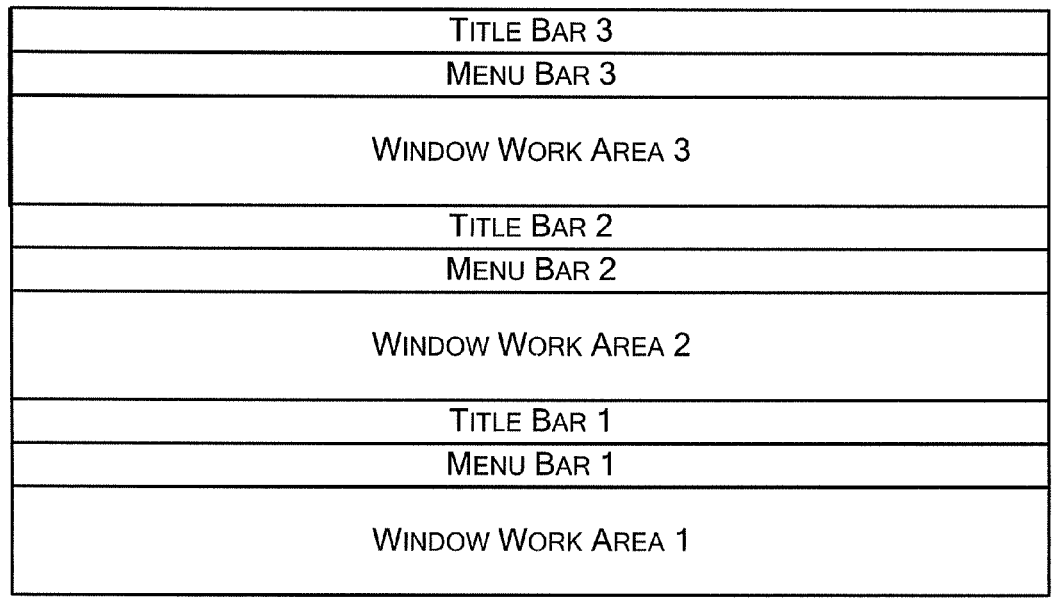
Figure 2:
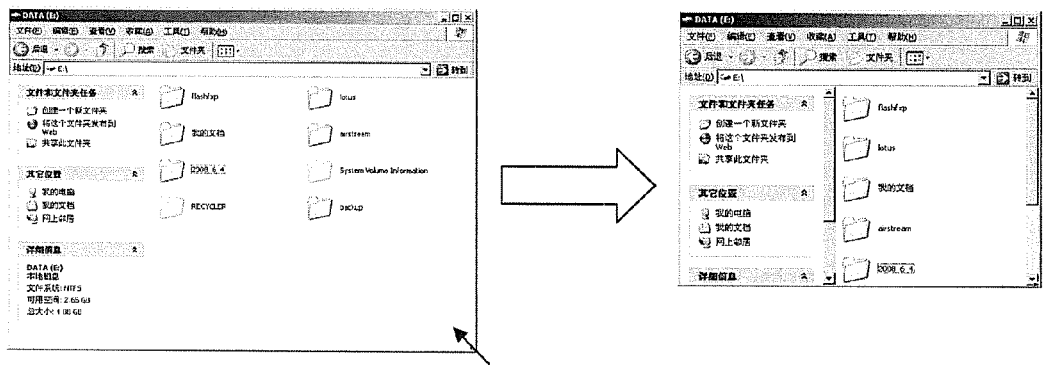
FIG. 2 is a schematic diagram showing windows before/after scaling according to the prior art.

According to the above correspondence, for the window arrangement shown in FIG. 1a, the user only needs to move the cursor vertically by using a mouse. Upon detecting the movement of the cursor, the arrangement of the currently opened windows is determined to be changed into an arrangement in which the screen is equally divided in a vertical direction. At this time, an instruction can be generated according to this determination, instructing the operation system to adjust the size and location of each of the windows, such that the three windows are displayed from top to bottom in three parts into which the screen is equally divided.

It can be appreciated that the above description exemplifies just two possible correspondences. A variety of correspondences can also be used. For example, when the movement trail of a cursor is an arc running clockwise, the screen can be divided into parts spaced at a certain interval, and the currently opened windows are arranged from top to bottom in these parts.

In the embodiments of the present invention, the input operation can be represented by a movement trail of a cursor, a key-press operation or a movement trail of a touch on a touch screen. The mouse action will be taken as an example of input operation in the following description.

According to an embodiment of the present invention, windows of different types may be opened in an electronic device, and at least two of the windows currently opened may belong to different types of window applications.

In the example as shown in FIG. 1a, the three windows arranged from left to right can be of the same type or different types, such as a Word application window, an Excel application window, a music play window, a video play window, an instant chatting application window, etc.

According to an embodiment of the present invention, in order to intuitively and conveniently achieve management of the windows, the at least two windows currently opened are displayed in a tiled manner prior to the window control operation by the window control module.

Figure 7:
FIG. 7 is a schematic diagram showing that four windows are opened in a tiled arrangement to an embodiment of the present invention.

In the example shown in FIG. 1, there is no rule for window arrangement and the three windows overlap with each other. According to an embodiment of the present invention, the window control module can be configured to perform window control operation on a plurality of windows opened simultaneously, such that these windows can be displayed in a tiled manner, as shown in FIG. 7. FIG. 7 is a schematic diagram showing an arrangement in which four windows currently opened are arranged in a tiled manner according to an embodiment of the present invention. In FIG. 7, with the above window control module, the window arrangement of the embodiment of the present invention is performed under a certain rule, which facilitates subsequent operations, as further detailed hereinafter.

The window control module is also capable of performing, after a new window is opened, window control operation on the new window and the windows already opened, so that the windows currently opened can be displayed in a tiled manner. FIG. 8 shows a schematic diagram of a plurality of windows displayed in a tiled manner after a window is newly opened.

According to an embodiment of the present invention, a location determination control is introduced for facilitating the mouse operation by the user. The location determination control is presented on the screen and can be manipulated by the user with a mouse. In an embodiment of the present invention, when a plurality of windows are opened and displayed in a tiled manner, the location determination control is located at the "intersection" of these windows. As shown in FIG. 9, the circle denotes the location determination control provided according to the embodiment of the present invention, which is located at the position at which the four windows intersect each other.

With the provision of the location determination control according to the embodiment of the present invention, the input operation can be a drag operation of dragging the location determination control. Further, a window arrangement rule desired by the user can be determined from the user's dragging of the location determination control.

With reference to FIG. 9, the correspondence between the drag operation and the window arrangement rule according to an embodiment of the present invention can be listed as:

| Drag Operation | Window Arrangement Rule |
| --- | --- |
| Drag towards lower-left | Maximize upper right window and minimize the others |
| Drag towards lower-right | Maximize upper left window and minimize the others |
| Drag downwards | Two upper windows each occupy half of the screen while the lower windows are minimized |
| Drag upwards | Two lower windows each occupy half of the screen while the upper windows are minimized |
| Drag towards left | Two right windows each occupy half of the screen while the left windows are minimized |
| Drag towards right | Two left windows each occupy half of the screen while the right windows are minimized |
| Rotational Drag | The number of displayed windows remains unchanged, and each window is rotated to a location adjacent to it |

With the above rules, the user can collectively manage four screens with one operation. An example will be given below.

Figure 10:
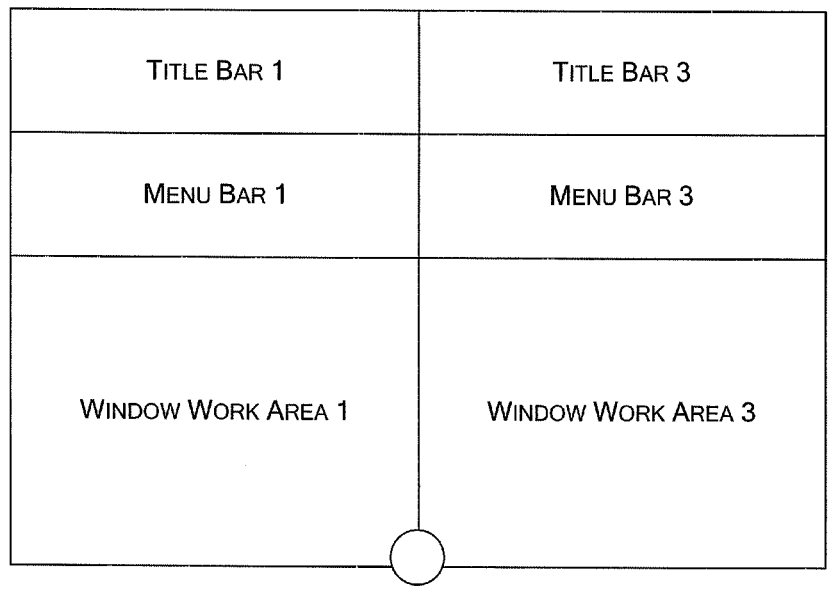
FIG. 10 is a schematic diagram showing the windows rendered on the screen after the operations by the location determination control.

It is assumed that, among the four windows shown in FIG. 9, the two upper windows are each document edit window and the two lower windows are an instant chatting window and a music play window, respectively. For example, the user wants to edit two documents with reference to each other. In this case, the user can drag the location determination control downwards with a mouse (or any other devices such as a touchpad). Upon detection of the input operation, it is determined that the operation of "drag downwards" corresponds to the window arrangement operation of "two lower windows each occupy half of the screen while the upper windows are minimized" based on the above correspondences. Thus, according to this arrangement rule, it can be determined that the two upper windows and their respective sizes and locations require change. Then, an instruction can be issued to the operation system to instruct the arrangement in which the two upper windows each occupy half of the screen while the lower windows are minimized, as shown in FIG. 10. As such, with only a single operation, the user can obtain the arrangement, which would otherwise require a plurality of operations.

The above embodiment provides only some possible operations and window arrangements. It can be appreciated that the present invention is not limited to the above described drag operations and window arrangements.

According to the above embodiment, the window control module can comprise:

a determination unit configured to determine at least two windows and their respective sizes and locations according to a window arrangement rule corresponding to the drag operation; and a control unit configured to perform the window control operation on the at least two windows according to the determination.

The provision of the above location determination control greatly facilitates a user's operation, since it is unnecessary for the user to remember which operation corresponds to which window arrangement rule.

The above location determination control may cause occurrence of erroneous operations. For example, the user may accidentally place the mouse on the control and drag it for a short distance, while the user does not want to change the size or location of the window. In order to avoid such erroneous operation, according to an embodiment of the present invention, a trigger module is further provided to determine whether the drag operation is valid based on an operation parameter of the drag operation and to activate the window control module if the drag operation is determined to be valid.

Herein, the operation parameter can be drag duration or drag distance.

For example, a rule can be preset that a drag operation of dragging the control module can be determined as valid only if the drag operation lasts at least 2 seconds. In this case, if the user only accidentally clicks the control module and drags it slightly, the duration of such operation is generally very short. Even if the input operation is detected, the trigger module will determine the drag operation as invalid, since the drag duration is shorter than the preset duration threshold. Thus, the window control module will not be activated for subsequent window management. In this way, erroneous operations can be effectively avoided.

In general, when a user manages a window, he or she intends to view the contents in the window. If each of at least two windows becomes very small after being subjected to the window control operation, the user experience will be quite poor. Since the area of the screen is constant, the more windows to be displayed, the smaller area each window occupies. In this case, some additional action should be taken. Herein, a decision module can be provided to decide, after the window control operation is performed on at least two windows, whether the size of a displayed window among the at least two windows is smaller than a predetermined size. When the size of the window is smaller than the predetermined size, the window control module performs a window control operation on the window, such that the size of the window is larger than or equal to the predetermined size.

There are a number of approaches for making the size of the window larger than or equal to the predetermined size. For example, one approach is to reduce the number of windows displayed on the screen.

To reduce the number of windows displayed on the screen is a straightforward approach, since it can enlarge the area occupied by the displayed windows. However, this may not coincide with the user's intention. In this case, the following approach can be employed to avoid this situation.

For example, the windows can be displayed on the screen in a cyclic manner. It is assumed that there are eight windows. If all the eight windows are displayed, only a very small screen area can be allocated to each window, and thus fewer contents can be displayed in the work area. If only four out of the eight windows are displayed, the four windows may not be the windows desired by the user. According to an embodiment of the present invention, four windows (such as windows 1, 2, 3 and 4) can be selected first to be rendered on the screen. If they are not desired by the user, the other four windows (such as windows 5, 6, 7 and 8) can be rendered on the screen after a period of time (e.g., 2 seconds). If the user's intention is still not satisfied, a different group of four windows (such as windows 1, 3, 5 and 7) can be selected to be rendered on the screen. This cycle can be continued until the user finds that the desired windows are all displayed together on the screen.

The user can indicate that the desired windows have been displayed together via a particular preset input operation.

In the above example, a window is described as an application window. However, this is only exemplary and the window can also be a large icon corresponding to a file or an application. In addition, an information presentation unit can be provided on the window for displaying the status of the file or application corresponding to the window.

For example, it is assumed that a window corresponds to a Word document. The window has the same shape and appearance as a normal Word icon but a different size. Additionally, an information presentation unit can be provided at a particular location in the Word icon, indicating "This file needs to be handled before day/month/year". In this way, the user can recognize more information of the file.

The window rendering management device of the window management apparatus according to the embodiment of the present invention has been described in detailed. As described above, the window management apparatus according to the embodiment of the present invention can further comprise a window element rendering management device configured to manage the rendering of elements in a target window when the target window is scaled. In the following, the window element rendering management device 303 according to the embodiment of the present invention will be described.

Figure 11:
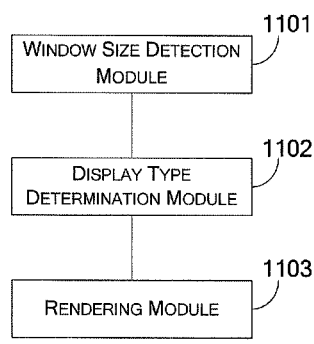
FIG. 11 is a schematic block diagram of the window element rendering management device according to an embodiment of the present invention.

FIG. 11 is a schematic block diagram showing the window element rendering management device according to the embodiment of the present invention. As shown in FIG. 11, the window element rendering management device 303 comprises: a window size detection module 1101 which detects, when the target window is scaled, the size of the scaled target window, a display type determination module 1102 which determines, based on a preset correspondence between window size and element display type, a display type of an element in the scaled target window; and a rendering module 1103 which renders the element in the target window according to the determined display type.

The window element rendering management device 303 according to the embodiment of the present invention can change the display type of the element in a window as the window is scaled. Since elements having different display types can provide different amounts of information to the user, it is possible to present more information to the user in a window, and the utilization of the window and thus the resources can be improved.

Figure 12:
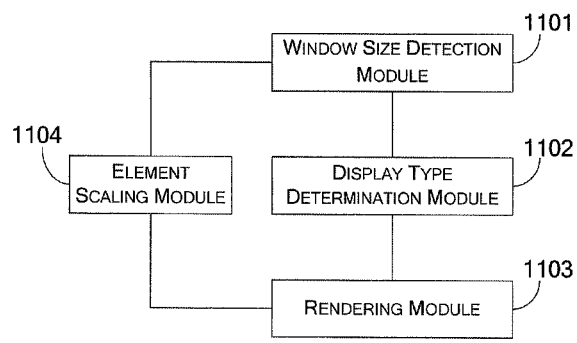
FIG. 12 is a schematic block diagram the window element rendering management device according to another embodiment of the present invention.

Different display types require different display areas. For example, for a display type that can provide a larger amount of information, a larger display area may be required. Thus, in order to present the elements having various display types while avoiding wastes of window display area, the size of each element can be scaled as the window is scaled. Reference is now made to FIG. 12, which is a schematic block diagram of the window element rendering management device according to another embodiment of the present invention. Compared with the blocks shown in FIG. 11, this window element rendering management device further comprises an element scaling module 1104 which detects a scale ratio at which the target window is scaled, determines, based on a preset correspondence between window scale ratio and element scale ratio, a scale ratio for an element in the target window, and determine the size of the element in the target window based on the determined scale ratio of the element.

Accordingly, the rendering module 1103 can be configured to render the element in the target window according to the determined display type and size of the element.

In practice, the number of elements displayed in the visible area of the window can be changed. To this end, the scale ratio of the element can be made smaller than the scale ratio of the window. The device can further comprise a rendering number determination module that determines the number of elements to be rendered in a visible area of the target window according to the size of the scaled target window and the size of each element in the target window.

Accordingly, the rendering module 1103 can be configured to render the elements in the target window according to the determined display types, sizes and number of the elements.

Herein, when the number of elements displayed in the visible area of the target window needs to be reduced due to scaling down, the rendering module 1103 can be configured to assign some of the elements currently shown in the visible area of the target window with a hidden attribute, based on the number to be reduced.

For a situation where more elements are to be rendered, element indices can be created for all elements based on a priori knowledge of all the elements to be displayed in a window. When the number of elements to be rendered in the visible area of the target window can be increased due to scaling up, the rendering module 1103 can look up the element indices and retrieve several elements, according to the number to be increased, and assign the acquired elements with a displaying attribute for presentation in the visible area of the target window.

In order to prevent an element from being excessively scaled up/down, a threshold can be preset and, accordingly, the unit can further comprise a determination module for determining, if a scale ratio of an element determined from the scale ratio of the target window exceeds the preset threshold, the scale ratio of the element to be equal to the preset threshold.

When an element contains an image and a text which are displayed at different layers or tiles, the element scaling module 1104 can comprise an object division sub-unit which determines, among the respective layer, an image layer for the image and a text layer for the text as separate layer for different objects; and a scaling sub-unit which changes the size of an object at the image layer according to the determined scale ratio of the element while maintaining the size of an object at the text layer unchanged.

In order to maintain a good appearance of the scaled window or element, a graphic formed of an edge of the target window or an edge of the element may be separately used as an object to be processed. If the object has at least one round corner, the unit can further comprise:

- a first scaling module configured to scale an area of the object other than the round corner according to the scale ratio of the target window or the element; and
- a second scaling module configured to obtain a radius and an angle of the round corner of the object, and scaling the radius of the round corner according to the scale ratio of the target window or the element while maintaining the angle of the round corner unchanged.

Figure 13:
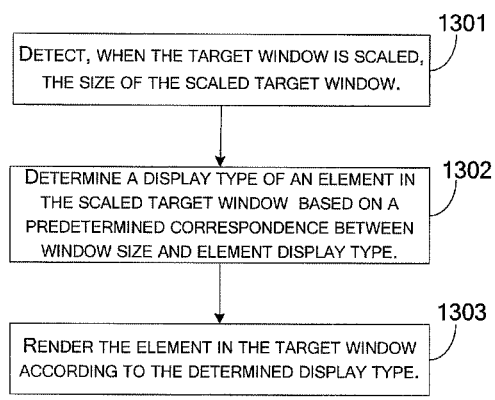
FIG. 13 is a flowchart illustrating the window element rendering management method according to an embodiment of the present invention.
Figure 14:
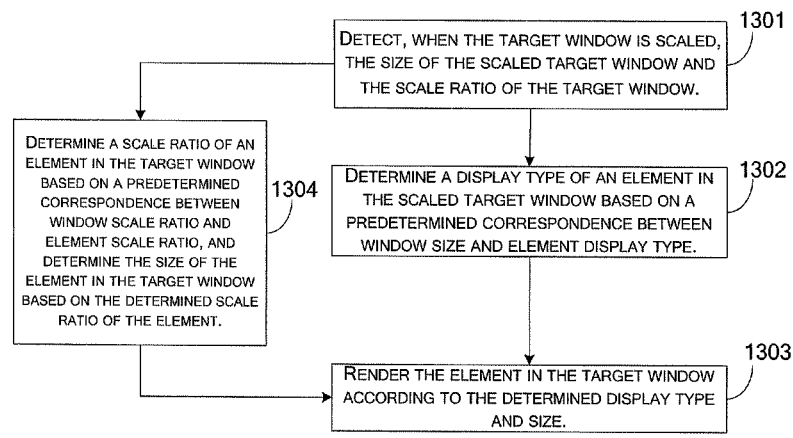
FIG. 14 is a flowchart illustrating the window element rendering management method according to another embodiment of the present invention.

The window element rendering management device and the operation thereof will be described in the following, by ways of embodiments, with reference to FIGS. 11 and 12 showing the window element rendering management device and to FIGS. 13 and 14 illustrating the operational flow of the window element rendering management device shown in FIGS. 11 and 12.

First Embodiment

Reference is first made to FIG. 13 which illustrates a window element rendering management method. In this method, at step 1301, when the target window is scaled, the size of the scaled target window is detected.

According to an embodiment of the present invention, a window may comprise a window created by an operation system (such as Windows) on a desktop (e.g., an application window or a folder window) or a document window created by an application. In particular, the window can be for example a file list window, a picture preview window or the like. In this case, an element in a window typically represents link information. For a window of a folder, the elements displayed in the folder are typically icons for the sub-folders and/or files in the folder. A folder or a file can be opened by double-clicking its corresponding icon. That is, each element serves as a link.

The scaling of a window may refer to a process in which the user drags the window with a mouse or a keyboard to scale the window, or a process in which the window is automatically scaled according to an instruction from a computer program. As long as the size of a window changes, the embodiment of the present invention will detect the changed size of the window.

Herein, the target window can be any of the windows currently opened on the user interface. The size of the window can be monitored using a function of the system. When the window is scaled, the size of the scaled window can also be acquired using a function of the window. Since the shape formed by the edges of a window is typically rectangular, the size of the window can be generally represented by the size of the rectangle. For example, the size of a window represented as 200*120 means that the window has a length of 200 and a width of 120.

It is to be noted that, when a window is scaled, the length and width of the window can be scaled simultaneously. The directions for scaling the length and the width can be identical to or different from each other. Also, the scale ratios for the length and the width can be identical to or different from each other. As an example, the length and the width of the window can be scaled up or down at the same time. In this case, an original window of 200*120 may become a window of 240*160 or 180*160. Alternatively, the length of the window can be scaled up while the width of the window can be scaled down. In this case, an original window of 200*120 may become a window of 240*80. In contrast, the length of the window can be scaled down while the width of the window can be scaled up. In this case, an original window of 200*120 may become a window of 180*160. The embodiment of the present invention is applicable to any of the above scaling operations.

At step 1302, a display type of an element in the scaled target window is determined based on a preset correspondence between window size and element display type.

At step 1303, the element in the target window is rendered according to the determined display type.

According to the present invention, the display type may correspond to different types of information, such as icon information, digest information or full information. Herein, the icon information generally refers to an icon displayed by default. Different icon styles may be used for a folder and a file. From these icons, it is possible to simply identify whether each link is directed to a folder or a file.

For a specific file, it is further possible to identify the type of the file with the icon. For example, it may be possible to identify whether the file is a picture, a Word document, or an Excel spreadsheet with the icon. The digest information is typically specific to a file. For example, the digest information for a picture file can be a thumbnail of the picture, whereas the digest information for a Word document can be a digest of the document. Also, the full information is typically file-specific. For example, the full information for a picture file can be the complete picture; whereas the digest information for a Word document can be all of the contents on the first page of the document.

For a file, if its display type corresponds to "full information", a maximum amount of information can be provided to the user by the element rendered in the window, since the full content of the file can be presented to the user in the window. If the display type in the window corresponds to "digest information", a large amount of information can be provided to the user, and the user can determine from the digest information a brief of the file content. If the display type in the window corresponds to "icon information", only a minimum amount of information can be provided to the user. In this case, the user can obtain only the type of the file but no hint to the particular content of the file. In addition to the link information, filename information of a file can be displayed in the window. The filename of a file can be defined by the user and thus can provide relevant information to the user. The above embodiments of the present invention relate to only how much information that can be provided to the user by the link information. The filename information is not yet taken into account.

According to the above embodiments of the present invention, it is possible to change the display type of the element in the target window when the size of the target window changes. For example, by changing the display type, it is possible to achieve the effect that the larger the window is, the larger amount of information the elements can provide. In order to achieve this effect, according to an embodiment of the present invention, a correspondence between window size and element display type can be preset. For example, it can be preset that a target window with a size smaller than 100*100 corresponds to a display type of "icon information", a target window with a size larger than 100*100 and smaller than 200*200 corresponds to a display type of "digest information", and a target window with a size larger than 300*300 corresponds to a display type of "full information". For example, an element in the target window has initially a display type of "icon information". When the window is scaled up and it is detected that the size of the target window becomes 150*180, the display type of the element can be changed from "icon information" to "digest information", indicating that the digest information of the file is to be displayed in the target window. As another example, an element in the target window may have initially a display type of "digest information". When the window is scaled down and it is detected that the size of the target window becomes 100*80, the display type of the element can be changed from "digest information" to "icon information", indicating that the icon information of the file is to be displayed in the target window. The specific numerical values mentioned above are exemplary and can be set depending on practical requirements. Alternatively, the above correspondence can be implemented in accordance with other rules. The present invention is not limited to the above rule.

It is to be noted that the scaling of a window can be a continuous process and thus the size of the window may be changed continuously. However, the display types of the element may be relatively limited. Hence, as the size of the window is changed continuously, the display type of the element may be changed in a few stages. In other words, each display type may correspond to a particular range of the window sizes.

In addition to presetting the correspondence between the window size and the element display type, it is also possible to generate in advance the digest information and the full information corresponding to each element and store the information. In this way, when information on a particular display type is required, the information can be directly retrieved and displayed. The generation of digest information and full information is known to one skilled in the art and the description thereof is thus omitted here.

Second Embodiment

Next, referring to FIG. 14, the following situation is considered in the process shown in FIG. 14.

For link information of a particular file as displayed in a window, change in its display type may influence the amount of information which can be provided by the link information. While the full information and the digest information can provide a larger amount of information than the icon information, they each require a larger display area. If the display area for an element is very small, it may be impossible to clearly display all the information. As such, it is still impossible to provide more information to user.

For example, a thumbnail of a picture is displayed in a window for providing the user with information on the contents of the picture. However, if the thumbnail is too small to be clearly identified by the user, the thumbnail will provide no desired information. If the files displayed in the window include pictures and documents which are both displayed as thumbnails, it may be even impossible to identify which links are directed to pictures and which links are directed to the documents. This reduces the effective utilization of the window. The effective utilization of window also lies in identifiability of the displayed elements. That is, it is not only necessary to render the elements, but also to render them sufficient clearly so that a user can identify the elements.

Regarding the above situation, when the target window is scaled, in addition to changing the display type of the element according to the size of the window, it is also required to detect the scale ratio at which the target window is scaled. Then, based on a preset correspondence between window scale ratio and element scale ratio, a scale ratio of an element in the target window is determined. Subsequently, the size of the element in the target window is determined based on the determined scale ratio of the element. The steps of this process will be detailed in the following.

At step 1301, when the target window is scaled, the size of the scaled target window and the scale ratio of the target window are detected.

Herein, the scale ratio of the target window can also be obtained using a function of the system. Since the length and width of the target window may be scaled at the same time and have different scale directions and ratios, the scale ratio of the target window contains two values, one for the scale ratio of the length of the target window, the other for the scale ratio of the width of the target window. For the purpose of description, in the embodiment of the present invention, the scale ratio of the length of the target window is referred to as a lateral scale ratio of the target window, while the scale ratio of the width of the target window is referred to as a longitudinal scale ratio of the target window.

For example, if a window is scaled from 100*120 to 150*90, the lateral scale ratio of the window is 150/100=1.5 and the longitudinal scale ratio of the window is 90/120=0.75.

At step 1302, a display type of an element in the scaled target window is determined based on a preset correspondence between window size and element display type.

At step 1304, a scale ratio of an element in the target window is determined based on a preset correspondence between window scale ratio and element scale ratio, and the size of the element in the target window is determined based on the determined scale ratio of the element.

This step can achieve the effect of changing the size of the element with the scaling of the window. For example, the scaling direction of the element can be the same as that of the window. In other words, the element can be scaled up if the window is scaled up, or scaled down if the window is scaled down.

In order to achieve this effect, a correspondence between window scale ratio and element scale ratio can be preset. For example, such correspondence can be expressed by the following formula: Element Scale Ratio=Window Scale Ratio*0.8. Herein, similar to a window, the size of an element is typically represented as length*width. Thus, the element scale ratio also includes a lateral scale ratio and a longitudinal scale ratio. In the above formula, when the term on the left represents the lateral scale ratio of an element, the term on the right represents the corresponding lateral scale ratio of a window. Likewise, when the term on the left represents the longitudinal scale ratio of an element, the term on the right represents the corresponding longitudinal scale ratio of a window. Herein, the factor 0.8 in the formula is only exemplary and can be modified into a different value. Alternatively, a different formula can also be used. In addition, it is also possible to set different criteria according to the type of the file to which the element is directed. As an example, different formulas can be used respectively for calculating the scale ratio of a picture and the scale ratio of a movie icon. The present invention is not limited to any particular formula.

To sum up, when a window is scaled, it is possible to calculate the scale ratio of the element based on the above formula after obtaining the scale ratio of the window. Then, the size of the scaled element can be calculated by multiplying the initial display size of the element prior to scaling with the calculated scale ratio of the element.

It is to be noted that the scaling of the window can be a continuous process. Thus, the element can be scaled continuously as the window is being scaled. Furthermore, the steps 1302 and 1304 can be performed in parallel.

At step 1303, the element in the target window is rendered according to the determined display type and size.

With the determination of the display type and the size of the elements, the element can be displayed in the scaled target window according to the above determined display type and size.

It can be seen from the second embodiment that the steps 1302 and 1304 can achieve the effect of scaling the size of the element as the window is being scaled. Further, the display type of the element may also change.

For example, the icon information of many pictures can be displayed in the target window by default. When the target window is scaled up, the display size of the icons will be scaled up accordingly. When the target window is scaled up to a certain extent, the display types of the elements will become "digest information". In this case, the thumbnails for these pictures will be displayed in the target window. If the target window is further scaled up, the display sizes of the thumbnails will be scaled up accordingly. When the target window is scaled up to a certain extent, the display types of the elements will become "full information". Then, a full picture may be displayed in the target window. At the same time, the thumbnail information of other pictures can be displayed at the remaining locations in the visible area of the target window.

As another example, the thumbnails of many pictures can be displayed in the target window by default. If the target window is scaled down, the display sizes of the thumbnails will be scaled down accordingly. When the target window is scaled down to a certain extent, the display types of the elements will become "icon information". In this case, the icons of the pictures can be displayed in the target window.

It can be seen that the second embodiment can achieve the following effects. When the target window is scaled up, the elements therein are also scaled up. When the target window is large enough, it is possible to render the elements in the target window with a display type capable of providing more information. Thus, the situation in which the display sizes of the elements are too small to be clearly identified by the user can be avoided. Thus, the identifiability of the element can be guaranteed. That is, the amount of information provided by the digest information and the full information can be actually available to the user.

In contrast, as the target window is scaled down, the elements therein are also scaled down. If the target window is scaled down to a certain extent, the elements can be rendered in the target window with a display type providing a smaller amount of information, in order to avoid the situation in which the display sizes of the elements are too small to be clearly identified by the user.

A display type having a larger amount of information requires an element having a larger display size. However, if the element display type in the target window becomes a display type of full information, it is indicated that the display size of the element is large enough. Thus, when the element display type in the target window is already "full information" and the target window is further scaled up, the display sizes of the elements therein will not be further scaled up. On the other hand, a display type having a smaller amount of information, such as icon information, does not require an element having a larger display size. In this case, the user may not be able to clearly identify the icon if the display size of the element is too small. As such, according to an embodiment of the present invention, an upper limit and a lower limit can be set for element scaling. For example, it can be set that an element can only be scaled down to a minimum of $1/5$ of its original size and scaled up to a maximum of 1.5 times larger than its original size. In this way, during element scaling, if an element has been scaled down to $1/5$ of its original size, and even if the window is further scaled down, the size of the element will remain unchanged, rather than being further scaled down, and vice versa.

Third Embodiment

In the second embodiment, it is required to set in advance the correspondence between the window scale ratio and the element scale ratio. In a real implementation, the element scale ratio can be equal to the window scale ratio. That is, the element can be scaled at the same ratio as the window. In this case, when the size of the target window is changed, the display size of the element can be changed at the same ratio. Thus, the ratio between the size of the target window and the display size of the element remains unchanged. To some extent, this ratio affects the layout of the visible area of the window (such as the number of rows, the number of columns, the distance between elements, etc.) and the number of elements which can be displayed in the visible area of the window. For a target window having a width of 100 and an element having a width of 30, for example, three elements can be displayed in each row. Thus, in this case, the layout and the number of elements displayed in the visible area of the target window remain the same as those prior to the scaling.

The number of elements displayed in the visible area of the window is also a key factor affecting the utilization of the window. In the third embodiment, the element scale ratio can be smaller than the window scale ratio, that is, the scaling of the element is slower than the scaling of the window. In this case, when the target window is scaled, the ratio between the size of the target window and the display size of the element may vary due to the slower change of the display size of the element. In this way, the arrangement and/or the numbers of the displayed elements in the visible area of the target window can be changed with the changes in the size of the target window, the display size of the elements and the display type of the elements.

For the purpose of clarity, the relationship between a window and its visible area is explained at first. A window can actually contain more contents than what is currently displayed therein. In other words, when viewing a scene through a window, one can only view a part of the scene which has the same size as that of the window, the viewed part being referred to as visible area. That is, the area in the window where the contents can be actually viewed by the user is the visible area of the window. If the contents to be displayed in the window are more than the contents which can be displayed in the visible area, a scroll bar will appear on the right side and/or bottom of the window. The contents displayed in the visible area can be changed by dragging the scroll bar.

In a real implementation, after obtaining the size of the scaled target window and determining the display size of the elements therein, the number of elements to be displayed in the visible area of the target window can be determined from the size of the scaled target window and the display size of the elements in the target window. For example, the size of the scaled target window can be divided by the display size of the elements and the integer part of the quotient can serve as the number of elements to be displayed in the visible area of the target window. The arrangement of the elements in the target window can also be changed.

Herein, when the number of elements displayed in the visible area of the target window needs to be reduced due to scaling down, determination can be made as to how many elements will be reduced. Based on the determined number, some of the elements currently displayed in the visible area of the target window can be marked as hidden. In this way, these marked elements will not be displayed in the visible area of the target window.

On the other hand, when the number of elements rendered in the visible area of the target window needs to be increased due to scaling up, determination can be made as to how many elements will be added. Based on the determined number, some elements which are not displayed currently in the visible area of the target window can be displayed. In this case, in order to facilitate the implementation, element indices can be created for all the elements based on a priori knowledge of all the elements to be displayed in the target window. When the number of elements is to be increased, it is possible to look up the element indices, acquire some elements according to the number of elements to be increased, and display them in the visible area of the target window. For example, there can be elements indexed as 1-20 in the created element indices. The elements indexed as 1-8 are displayed prior to scaling. After the window is scaled up, it is determined that one more element can be displayed in the visible area of the window. In this case, according to the element indices, the element indexed as 9 can be marked as having a displaying attribute and then displayed in the visible area.

For even a higher utilization of the visible area of the window, one or more scaled-down elements can be displayed at a position where an element having a normal size cannot be completely displayed, to indicate that there are some additional elements not displayed in the window. In this case, for such elements having a size smaller than normal, they can be displayed in gray color and can be set as inoperable, that is, operation on such elements is invalid (in other words, when operating, such as clicking, on such an element, the file to which the element is directed will not be invoked).

Moreover, as described above, when displaying an element in a window, the name of a file folder or file to which the element is directed can be displayed in additional to the link information like an icon or a thumbnail. The name can be represented in text. According to an embodiment of the present invention, when scaling the element, only the link information (such as icon or thumbnail) is scaled while the size of the text remains unchanged. The location of the text can be changed according to the rearrangement of the window.

Further, when the display type of the link information is "digest information", there may be a text in the digest information. For example, a thumbnail of a video file may contain text information in addition to an image. In order to prevent change in the size of the text from affecting the display of the thumbnail, only the image portion is scaled while the text remains unchanged. The premise for achieving this is that the image and the text in the digest information are displayed at different layers (In particular, in generation of the digest information, the image and the text can be set at different layers). In this way, the size of the text can be maintained by determining an image layer for the image and a text layer for the text as different layers and changing the size of the element at the image layer according to the determined scale ratio of the element while maintaining the size of the element at the text layer unchanged. That is, the image layer and the text layer can be considered as independent of each other. If the arrangement of the elements in the window is changed, the location of the text layer can be changed accordingly, which means that the location relative to the image layer can be maintained substantially constant.

Figure 15A:
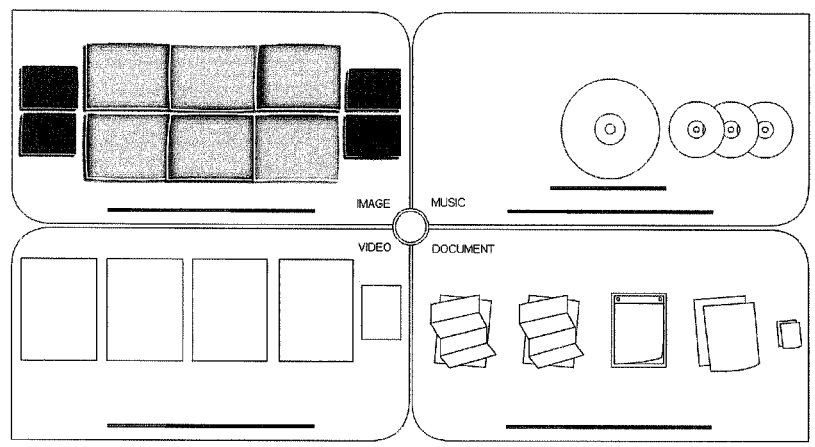
FIGS. 15a-15d are schematic diagrams showing element changing with the window scaling by the window element rendering management of an embodiment of the present invention.
Figure 15B:
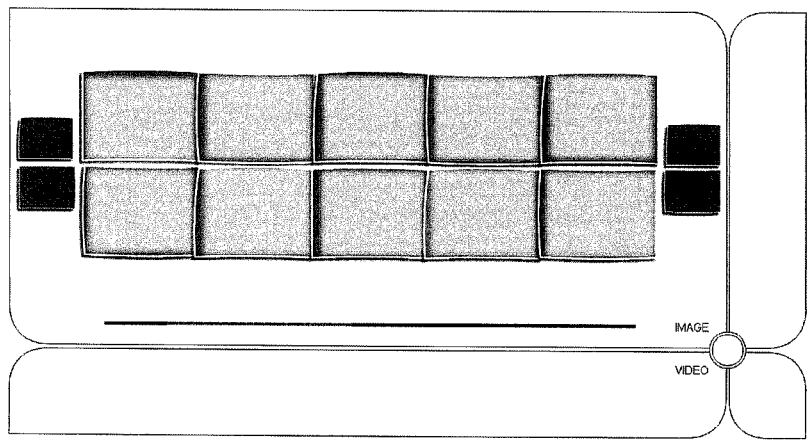
Figure 15C:
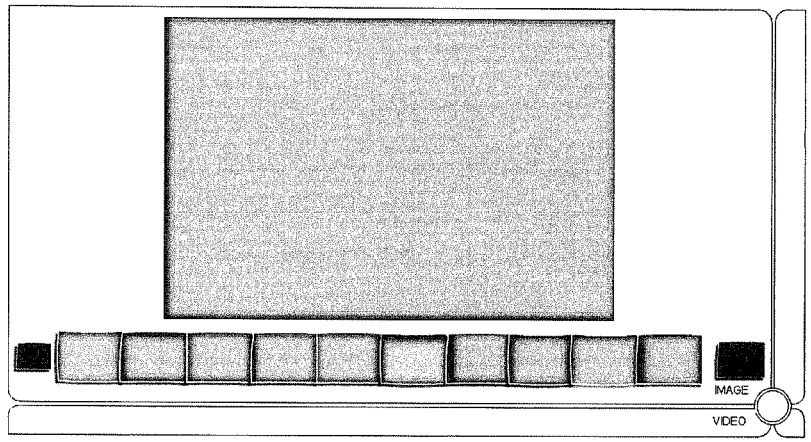
Figure 15D:
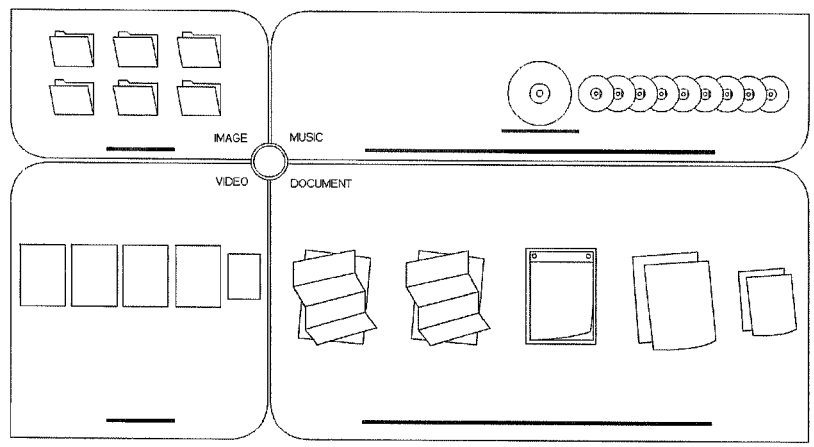

In order to explain the effects according to the third embodiment of the present invention, some comparisons are made which will be described with reference to the drawings. Referring to FIG. 15a, it shows the contents displayed in visible areas of a target window prior to scaling. The window is divided into four visible areas for displaying links directed to different types of files. For example, thumbnails of picture files are displayed in the upper left visible area; thumbnails of audio files are displayed in the upper right visible area, thumbnails for video files are displayed in the lower left visible area; and thumbnails for document files are displayed the lower right visible area. FIG. 15b shows displaying the upper left visible area of the target window in FIG. 15a after it is scaled up. FIG. 15c shows displaying the upper left visible area of the target window in FIG. 15b after it is further scaled up. FIG. 15d shows displaying the upper left visible area of the target window in FIG. 15d after it is scaled down.

It can be seen that, in FIG. 15a, six normally sized thumbnails and four scaled down thumbnails are displayed in the upper left visible area. In FIG. 15b, in which the visible area is scaled up, ten normally sized thumbnails and four scaled down thumbnails are displayed in the visible area. Further, the size of each of the normally displayed thumbnails in FIG. 15b is larger than the size of each of the normally displayed thumbnails in FIG. 15a. Herein, the thumbnails normally displayed in the middle are operable, i.e., they can be clicked to activate a picture view mode. On the contrary, the small, dark thumbnails near both edges only indicate that there is link information associated with additional pictures to the left and right side of the visible area. They cannot be clicked by the user. The small, dark thumbnails can only be clicked if they become normally displayed, as the visible area is further scaled up.

After the upper left visible area of the target window in FIG. 15b is further scaled up, it can be seen from FIG. 15c that a complete picture is displayed in the upper left visible area. Meanwhile, a row of thumbnails are displayed below the visible area and a small, dark thumbnail is displayed near the edges of the visible area. From FIG. 15a to FIG. 15b and to FIG. 15c, the process in which the target window is scaled up and also change in the elements in the target window can be seen. Further, it can be seen from FIG. 15d that, when the upper left visible area of the target window in FIG. 15a is scaled down, the elements displayed in the visible area become icons of the pictures, and the size of the icons are smaller than the size of the thumbnails prior to the scaling down of the window.

In practice, more visual effects can be added with particular programs. For example, different display styles can be used for elements directed to different types of files. For example, a thumbnail of a picture can be displayed in a distorted manner and a backlight effect can be added to a thumbnail of a video. When a window is scaled or a scroll bar is dragged, an element which is going to appear or disappear may fade in or out. As an example, when a window is scaled down, a picture at the edge of the window may gradually become smaller and darker and finally disappear as the edge of the window moves inwards.

Fourth Embodiment

In the above three embodiments, when a window is scaled, the elements displayed in the window are subjected to certain adjustment. However, in the fourth embodiment, a good appearance of the displayed shape of a window or an element after scaling is additionally taken into account.

Figure 16A:
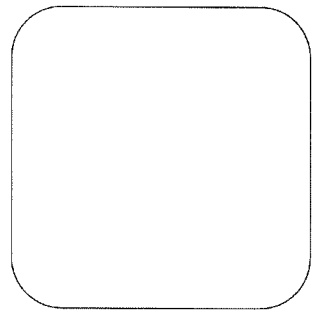
FIGS. 16a-16b are schematic diagrams showing a window having round corners before/after scaling according to the prior art.
Figure 16B:

In practice, the image formed of the edge of a window or an element (such as a thumbnail) is typically a standard rectangle. In this case, the shape of the scaled window or shape can remain as a regular rectangle. However, sometimes the image formed of the edge of a window or an element may not be a regular rectangle. For example, sometimes a window can have round corners instead of a right-angle corner. The round corners may make the window more pleasing to the user (for convenience of description, a window with round-corners is herein referred to as a round-corner window). FIG. 16a shows a round-corner window having a size of 120*120, in which each round corner is an arc of 90-degree angle. The scaling of such a round-corner window may suffers from a problem that, if the scale ratios of the length and the width are different from each other, the shape of the round corner will be changed, and thus the shape of the scaled window may become no longer good-looking. FIG. 16b shows a schematic diagram of a round-corner window in which the length and the width are not scaled at the same ratio. It is assumed that the size of the scaled window becomes 200*64. It can be seen from FIG. 16b that the original round-corner is no longer an arc of 90 degrees I, and its good-looking appearance is affected. Likewise, the same problem happens to the element of the window. The fourth embodiment is made to provide a solution to this problem. For the purpose of explanation, the following description will be given taking a window as an example. It can be appreciated that the processing of window is also applicable to an element having a similar shape.

First, it is assumed that the round-corner window is of a size of 120*120 prior to scaling, as shown in FIG. 16a. Each round corner is an arc of 90-degree angle. Now its size needs to be scaled to 200*80. The process according to the fourth embodiment comprises the following steps.

A radius and an angle of the round corner can be obtained first, and then areas of the round-corner window other than the round corner are scaled according to the scale ratio of the window. Subsequently, the radius of the round corner is scaled according to the scale ratio of the window, while the angle of the round corner remains unchanged. Here, the scale ratio of the window may comprise a lateral scale ratio and a longitudinal scale ratio. When scaling the radius of the round corner according to the scale ratio of the window, the scale ratio of the radius can be the same as the lateral or longitudinal scale ratio. Finally, the scaled round corner and the scaled non-round-corner area can be combined together. A further detailed description will be given below.

To facilitate implementation, the process according to the fourth embodiment can be as follows.

Figure 17A:
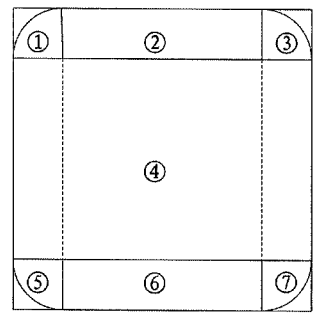
FIGS. 17a-17b are schematic diagrams showing a window having round corners before/after scaling according to the window element rendering management of an embodiment of the present invention.

Referring to FIG. 17a, the original round-corner window is divided into seven areas according to the dashed lines shown in the figure. Herein, areas ①, ③, ⑤ and ⑦ are round-corner areas; whereas areas ②, ④ and ⑥ are non-round-corner areas. In particular, each edge of the round-corner window is initially tangential to the round corners at both ends of the edge. Thus, to divide the window, the seven areas shown in FIG. 17a can be obtained by determining the tangent point between each edge and the corresponding round corner, connecting each pair of tangent points and removing connection lines other than those lie in horizontal or vertical direction.

After the completion of the above, the following steps can be carried out.

At step 1, when the round-corner window is scaled, the scale ratio of the round-corner window is obtained and the non-round-corner areas ②, ④ and ⑥ are scaled according to the obtained scaled ratio of the window.

At step 2, the lateral or longitudinal scale ratio of the window is determined as the scale ratio of the radius of each round corner.

At step 3, the radius of each round corner is scaled according to the scale ratio determined at step 2.

At step 4, the scaled areas are moved to be combined together in accordance with their original relative positions.

Figure 17B:
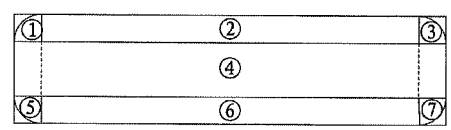

If the size of the scaled window is 200*80, the result is shown in FIG. 17b which appears more pleasing when compared with the effect shown in FIG. 16b.

In the above process, the lateral or longitudinal scale ratio of the window is determined as the scale ratio of the radius of each round corner. However, in practice, if the radius of a round corner is excessively scaled up, the overall appearance of the round-corner window may be affected. Thus, in another embodiment of the present invention, change in the radius of the round corner can be controlled.

If both the length and the width of the scaled window are two times larger than the radius of each round corner, the radius of each of the four round corners can remain, and only the location of each round corner changes. If the length or the width of the scaled window is smaller than two times of the radius of each round corner, the radius of each of the four round corners can be determined to be ½ (or another value) of the minimum of the length and the width of the scaled window. At this time, the respective sizes and locations of the four round corners need to be changed simultaneously.

In this way, the radius of each of the four round corners will be changed only if MIN(length, width)<2*radius, where length and width represent the length and the width of the scaled window, respectively, and radius represents the radius of each round corner prior to scaling.

The calculated radius of the scaled round corner can be represented as r and the overall length and width of the scaled round-corner window can be represented as w and h, respectively. The sizes and relative locations of the seven areas shown in FIG. 17b after scaling are shown in Table 1 below.

TABLE 1

| Area Number | X Coordinate | Y Coordinate | Width of Area | Length of Area |
|---|---|---|---|---|
| ① | 0 | 0 | r | r |
| ② | r | 0 | w − 2 * r | r |
| ③ | w − r | 0 | r | r |
| ④ | 0 | r | w | h − 2 * r |
| ⑤ | 0 | h − r | r | r |
| ⑥ | r | h − r | w − 2 * r | r |
| ⑦ | w − r | h − r | r | r |

Also, the radius of the round corner can be scaled in other ways. For example, when scaling a round-corner window, the radius of each round corner can be scaled down if it is satisfied that MIN(length, width)<L, where L is a value larger than 2*radius. The scale ratio of the radius of the round corner equals to the overall scale ratio of the round-corner window multiplied by a factor smaller than 1. In this way, the round corner can be scaled down faster than the overall scaling down of the window.

In addition to the above described approaches, one skilled in the art can employ other approaches for scaling the radius of a round corner as desired. Their descriptions are omitted herein.

It is to be noted that, in the above example, a window has four round corners. However, a window may have one, two or three round corners depending on actual implementations. The above scaling approaches also apply to a round-corner window having less or more than four round corners. The detailed description is omitted herein.

According to an embodiment of the present invention, a computing device is also provided, which comprises a processor, an input device, a storage device and a display device, wherein the display device has at least two windows opened thereon and the processor is configured to detect an input operation input from the input unit and perform, according to the detected input operation, window management operation on the at least two windows to change the sizes and locations of the at least two windows simultaneously.

Further, the computing device can be configured to change, when a target window to which the input operation is directed is scaled, displaying of the elements in the target window.

While the present invention has been described with reference to the above preferred embodiments, a number of variants and modifications can be made by those skilled in the art without departing from the scope of the present invention.

What is claimed is:

1. A window management apparatus configured to manage at least two windows opened in an electronic device, comprising:
   a window rendering management device adapted to manage the at least two windows in response to an input operation, to change the size and location of a target window of the at least two windows to which the input operation is directed, and simultaneously adaptively change the size and location of at least one other window of the at least two windows; and
   a window element rendering management device configured to manage the rendering of an element in the target window when the target window is scaled;
   wherein the window element rendering management device comprises:
   a window size detection module configured to detect the size of the target window when the target window has been scaled;
   a display type determination module configured to determine display type of an element in the scaled target window based on a preset correspondence between window size and element display type;
   an element scaling module configured to detect the scale ratio of the target window which is scaled, to determine a scale ratio of an element in the target window based on preset correspondence between window scale ratio and element scale ratio, and to determine the size of the element in the target window based on the determined scale ratio of the element, wherein when the element scale ratio is smaller than the window scale ratio, the element scaling module further determines the number of elements to be rendered in a visible area of the target window according to the size of the scaled target window and the size of each element in the target window, and
   a rendering module configured to render the elements in the target window according to the determined display types and sizes and the determined number of the elements; and
   wherein, when the number of elements to be displayed in the visible area of the target window needs to be reduced due to scaling, the rendering module is configured to mark some of the elements rendered in the visible area of the target window prior to scaling as having a hidden attribute according to the number of elements to be reduced.

2. The window management apparatus according to claim 1, wherein the window rendering management device comprises:
   an input detection module configured to detect the input operation; and
   a window control module configured to perform, according to the input operation detected by the input detection module, window control operation on the target window and the at least one other window, to change the size and location of the target window and simultaneously adaptively change the size and location of the at least one other window.

3. The window management apparatus according to claim 2, wherein, after the window control module performs the window control operation, the target window and the at least one other window, which remains displayed on the screen of the electronic device, do not overlap with each other.

4. The window management apparatus according to claim 2, wherein, before the window control module performs the window control operation, the target window and the at least one other window are displayed in a tiled manner.

5. The window management apparatus according to claim 2, wherein the input detection module is configured to detect a change in location of a touch on the screen of the electronic device.

6. The window management apparatus according to claim 2, wherein the input operation corresponds to a window arrangement rule; and the window control module performs the window control operation on the target window and the at least one other window according to the window arrangement rule corresponding to the input operation detected by the input detection module.

7. The window management apparatus according to claim 6, further comprising:
- a location determination control presented on the screen;
- wherein the input operation is a drag operation on the location determination control; and
- the window control module comprises:
  - a determination unit configured to determine the respective target sizes and target locations of the target window and the at least one other window according to a window arrangement rule corresponding to the drag operation; and
  - a control unit configured to perform the window control operation on the target window and the at least one other window according to the determined target sizes and target locations.

8. The window management apparatus according to claim 7, wherein, the window rendering management device further comprises:
- a trigger module configured to determine whether the drag operation is valid based on an operation parameter of the drag operation and to trigger the window control module if the drag operation is determined to be valid.

9. The window management apparatus according to claim 2, wherein the window rendering management device further comprises:
- an adjustment module configured to perform a window adjustment operation on a window remaining displayed on the screen, when the size of the window is smaller than a predetermined size after the window control module performs the window control operation, so that the size of the window is larger than or equal to the predetermined size.

10. The window management apparatus according to claim 2, wherein each window corresponds to a file or an application, and there is an information presentation unit provided on each window for displaying the state of the file or application corresponding to the window.

11. The window management apparatus according to claim 1, wherein, if a scale ratio of an element determined from the scale ratio of the target window exceeds a preset threshold, the element scaling module is configured to determine the scale ratio of the element to be equal to the preset threshold.

12. The window management apparatus according to claim 1, wherein, the window element rendering management device also manage an element in the at least one other window which is scaled, in addition to the rendering of the element in the target window.

13. A window management apparatus configured to manage at least two windows opened in an electronic device, comprising:
- a window rendering management device adapted to manage the at least two windows in response to an input operation, to change the size and location of a target window of the at least two windows to which the input operation is directed, and simultaneously adaptively change the size and location of at least one other window of the at least two windows; and
- a window element rendering management device configured to manage the rendering of an element in the target window when the target window is scaled;
- wherein the window element rendering management device comprises:
  - a window size detection module configured to detect the size of the target window when the target window has been scaled;
  - a display type determination module configured to determine display type of an element in the scaled target window based on a preset correspondence between window size and element display type;
  - an element scaling module configured to detect the scale ratio of the target window which is scaled, to determine a scale ratio of an element in the target window based on preset correspondence between window scale ratio and element scale ratio, and to determine the size of the element in the target window based on the determined scale ratio of the element, wherein when the element scale ratio is smaller than the window scale ratio, the element scaling module further determines the number of elements to be rendered in a visible area of the target window according to the size of the scaled target window and the size of each element in the target window, and
  - a rendering module configured to render the elements in the target window according to the determined display types and sizes and the determined number of the elements;
- wherein, the window management apparatus is configured to create element indices for all the elements after learning all the elements to be displayed in the target window; and
- when the number of elements to be rendered in the visible area of the target window is increased due to scaling, the rendering module is configured to look up the element indices and to acquire a number of elements according to the number of elements, and to mark the acquired elements as having a displaying attribute so as to render them in the visible area of the target window.

14. A window management apparatus configured to manage at least two windows opened in an electronic device, comprising:
- a window rendering management device adapted to manage the at least two windows in response to an input operation, to change the size and location of a target window of the at least two windows to which the input operation is directed, and simultaneously adaptively change the size and location of at least one other window of the at least two windows; and
- a window element rendering management device configured to manage the rendering of an element in the target window when the target window is scaled;
- wherein the window element rendering management device comprises:
  - a window size detection module configured to detect the size of the target window when the target window has been scaled;
  - a display type determination module configured to determine display type of an element in the scaled target window based on a preset correspondence between window size and element display type;
  - an element scaling module configured to detect the scale ratio of the target window which is scaled, to determine a scale ratio of an element in the target window based on preset correspondence between window scale ratio and element scale ratio, and to determine the size of the element in the target window based on the determined scale ratio of the element, wherein when the element scale ratio is smaller than the window scale ratio, the element scaling module further determines the number of elements to be rendered in a visible area of the target window according to the size of the scaled target window and the size of each element in the target window, and a rendering module configured to render the elements in the target window according to the determined display types and sizes and the determined number of the elements;

wherein, when an element in the target window contains an image and a text which are displayed at different layers, the element scaling module is configured to determine the respective layers for the image and the text, to determine an image layer for the image and a text layer for the text as different objects, and to change the size of an object at the image layer according to the determined scale ratio of the element, while the size of an object at the text layer remains unchanged.

15. A window management method for managing at least two windows opened in an electronic device, comprising:
   a window rendering management step of managing the at least two windows in response to an input operation, to change the size and location of a target window of the at least two windows to which the input operation is directed, and simultaneously adaptively change the size and location of at least one other window of the at least two windows; and
   a window element rendering management step of managing the rendering of an element in the target window when the target window is scaled;
   wherein the window element rendering management step comprises:
      detecting the size of the target window when the target window has been scaled;
      determining display type of an element in the scaled target window based on a preset correspondence between window size and element display type;
      detecting the scale ratio of the target window, determining a scale ratio of an element in the target window based on a preset correspondence between window scale ratio and element scale ratio, and determining the size of the element in the target window based on the determined scale ratio of the element;
      determining the number of elements to be rendered in a visible area of the target window according to the size of the scaled target window and the size of each element in the target window, when the element scale ratio is smaller than the window scale ratio; and
      rendering the elements in the target window according to the determined display types and sizes and the determined number of the elements; and
   wherein the step of rendering the elements in the target window according to the determined display types and sizes and the determined number of the elements comprises: marking, when the number of elements to be displayed in the visible area of the target window needs to be reduced due to scaling, some of the elements rendered in the visible area of the target window prior to scaling as having a hidden attribute according to the number of elements to be reduced.

16. The window management method according to claim 15, wherein the window rendering management step further comprises:
   detecting the input operation; and
   performing, according to the detected input operation, window control operation on the target window and the at least one other window, to change the size and location of the target window and simultaneously adaptively change the size and location of the at least one other window.

17. The window management method according to claim 16, wherein, after the window control operation, the target window and the at least one other window, which remains displayed on the screen of the electronic device, do not overlap with each other.

18. The window management method according to claim 16, wherein the step of detecting the input operation comprises detecting a change in location of a touch on the screen of the electronic device.

19. The window management method according to claim 16, wherein the input operation corresponds to a window arrangement rule; and the step of performing window control operation comprises: performing the window control operation on the target window and the at least one other window according to the window arrangement rule corresponding to the detected input operation.

20. The window management method according to claim 19, wherein the window rendering management step further comprises:
   presenting a location determination control on the screen; wherein
   the input operation is a drag operation on the location determination control; and
   the step of performing window control operation comprises:
      determining the respective target sizes and target locations of the target window and the at least one other window according to a window arrangement rule corresponding to the drag operation; and
      performing the window control operation on the target window and the at least one other window according to the determined target sizes and target locations.

21. The window management method according to claim 20, wherein the window rendering management step further comprises:
   determining whether the drag operation is valid based on an operation parameter of the drag operation and performing the step of performing window control operation if the drag operation is determined to be valid.

22. The window management method according to claim 16, wherein the window rendering management step further comprises:
   performing a window adjustment operation on a window remaining displayed on the screen, when the size of the window is smaller than a predetermined size after the window control operation, so that the size of the window is larger than or equal to the predetermined size.

23. The window management method according to claim 16, wherein each window corresponds to a file or an application, and wherein there is an information presentation unit provided on each window for displaying the state of the file or application corresponding to the window.

24. The window management method according to claim 15, wherein the window element rendering management step further comprises, after the step of determining a scale ratio of an element in the target window: if a scale ratio of an element determined from the scale ratio of the target window exceeds a preset threshold, determining the scale ratio of the element to be equal to the preset threshold.

25. The window management method according to claim 15, wherein a graphic formed of an edge of the target window or an edge of the element is used as an object to be processed; and wherein if the object has at least one round corner, the window element rendering management step further comprises:
   scaling an area of the object other than the round corner according to the scale ratio of the target window or the element; and obtaining a radius and an angle of the round corner of the object, and scaling the radius of the round corner according to the scale ratio of the target window or the element, while the angle of the round corner remains unchanged.

26. The window management method according to claim 15, wherein the window element rendering management step comprises managing an element in the at least one other window which is scaled, in addition to the rendering of the element in the target window.

27. A window management method for managing at least two windows opened in an electronic device, comprising:
 a window rendering management step of managing the at least two windows in response to an input operation, to change the size and location of a target window of the at least two windows to which the input operation is directed, and simultaneously adaptively change the size and location of at least one other window of the at least two windows; and
 a window element rendering management step of managing the rendering of an element in the target window when the target window is scaled;
 wherein the window element rendering management step comprises:
  detecting the size of the target window when the target window has been scaled;
  determining display type of an element in the scaled target window based on a preset correspondence between window size and element display type;
  detecting the scale ratio of the target window, determining a scale ratio of an element in the target window based on a preset correspondence between window scale ratio and element scale ratio, and determining the size of the element in the target window based on the determined scale ratio of the element;
  determining the number of elements to be rendered in a visible area of the target window according to the size of the scaled target window and the size of each element in the target window, when the element scale ratio is smaller than the window scale ratio; and
  rendering the elements in the target window according to the determined display types and sizes and the determined number of the elements;
 further comprising a step of creating element indices for all the elements after learning all the elements to be displayed in the target window;
 when the number of elements to be rendered in the visible area of the target window is increased due to scaling, the rendering module is configured to look up the element indices and to acquire a number of elements according to the number of elements, and to mark the acquired elements as having a displaying attribute so as to render them in the visible area of the target window;
 wherein the step of rendering the elements in the target window according to the determined display types and sizes and the determined number of the elements comprises: when the number of elements to be rendered in the visible area of the target window is increased due to scaling, looking up the element indices and acquiring a number of elements according to the number of elements to be increased, and marking the acquired elements as having a displaying attribute so as to render them in the visible area of the target window.

28. A window management method for managing at least two windows opened in an electronic device, comprising:
 a window rendering management step of managing the at least two windows in response to an input operation, to change the size and location of a target window of the at least two windows to which the input operation is directed, and simultaneously adaptively change the size and location of at least one other window of the at least two windows; and
 a window element rendering management step of managing the rendering of an element in the target window when the target window is scaled;
 wherein the window element rendering management step comprises:
  detecting the size of the target window when the target window has been scaled;
  determining display type of an element in the scaled target window based on a preset correspondence between window size and element display type;
  detecting the scale ratio of the target window, determining a scale ratio of an element in the target window based on a preset correspondence between window scale ratio and element scale ratio, and determining the size of the element in the target window based on the determined scale ratio of the element;
  determining the number of elements to be rendered in a visible area of the target window according to the size of the scaled target window and the size of each element in the target window, when the element scale ratio is smaller than the window scale ratio; and
  rendering the elements in the target window according to the determined display types and sizes and the determined number of the elements;
 wherein the step of determining the size of the element in the target window based on the determined scale ratio comprises: when an element in the target window contains an image and a text which are displayed at different layers, determining the respective layers for the image and the text, determining an image layer for the image and a text layer for the text as different objects, and changing the size of an object at the image layer according to the determined scale ratio of the element, while the size of an object at the text layer remains unchanged.

* * * * *